US012774940B2

(12) United States Patent
Gattinger

(10) Patent No.: US 12,774,940 B2
(45) Date of Patent: Oct. 27, 2026

(54) MEANS AND METHODS FOR SAMPLING SURFACES

(71) Applicant: DSM IP Assets B.V., Maastricht (NL)

(72) Inventor: Thomas Gattinger, Getzersdorf (AT)

(73) Assignee: DSM IP ASSETS B.V., Maastricht (NL)

(*) Notice: Subject to any disclaimer, the term of this patent is extended or adjusted under 35 U.S.C. 154(b) by 610 days.

(21) Appl. No.: 18/255,721

(22) PCT Filed: Nov. 30, 2021

(86) PCT No.: PCT/EP2021/083498
§ 371 (c)(1),
(2) Date: Jun. 2, 2023

(87) PCT Pub. No.: WO2022/117541
PCT Pub. Date: Jun. 9, 2022

(65) Prior Publication Data

US 2023/0417634 A1 Dec. 28, 2023

(30) Foreign Application Priority Data

Dec. 2, 2020 (EP) .................................... 20211333

(51) Int. Cl.
*G01N 1/00* (2006.01)
*G01N 1/02* (2006.01)

(52) U.S. Cl.
CPC ......... *G01N 1/02* (2013.01); *G01N 2001/028* (2013.01)

(58) Field of Classification Search
None
See application file for complete search history.

(56) References Cited

U.S. PATENT DOCUMENTS 574,476 A 1/1897 Coy
3,058,139 A * 10/1962 Dryden ................. A47K 7/028 15/187

(Continued)

FOREIGN PATENT DOCUMENTS

CN 206333947 U 7/2017
CN 207058386 U 3/2018
WO 2018195359 A1 10/2018

OTHER PUBLICATIONS

International Search Report for PCT/EP2021/083498 mailed Feb. 25, 2022, 4 pages.

(Continued)

*Primary Examiner* — Jyoti Mutreja
(74) *Attorney, Agent, or Firm* — NIXON & VANDERHYE P.C.

(57) ABSTRACT

The present invention relates to a device for fixation of a collecting means (9) suitable for collecting biological material, comprising a handle (1), a support means (2), and a fixation means (3), wherein the support means (2) and the fixation means (3) are provided at a common end (4) of the handle (1); wherein the support means (2) is adapted to receive the collecting means (9) covering an exposed end (13) of the support means (2) distal from the handle (1); wherein the fixation means (3) is adapted to provide at least a first clamp structure (5) adapted to fixate the collecting means (9) to the support means (2); wherein the fixation means (3) is substantially rigidly connected to the end (4) of the handle (1); and the fixation means (3) comprises at least a first section (6) distal to the end of the handle (1), and at least a second section (7) more proximal to the end (4) of the handle (1) than the at least first section (6); wherein the first section (6) is provided laterally distal to the longitudinal axis of the handle (1); wherein the second section (7) is provided laterally proximal to the longitudinal axis of the handle (1);

(Continued)

and wherein the second section (7) is adapted to fixate the collecting means (9). The present invention relates to a kit-of-parts comprising said device, to a method for hygiene monitoring and use of the device.

23 Claims, 3 Drawing Sheets

(56) References Cited

U.S. PATENT DOCUMENTS

| | | | | |
|---|---|---|---|---|
| 3,081,475 | A | 3/1963 | Vosbikian et al. | |
| 4,175,439 | A | 11/1979 | Laker | |
| 9,925,647 | B2 * | 3/2018 | Lafond | G01N 1/02 |
| 2013/0118275 | A1 | 5/2013 | Lafond et al. | |

OTHER PUBLICATIONS

Written Opinion of the ISA for PCT/EP2021/083498 mailed Feb. 25, 2022, 6 pages.

* cited by examiner

MEANS AND METHODS FOR SAMPLING SURFACES

This application is the U.S. national phase of International Application No. PCT/EP2021/083498 filed Nov. 30, 2021 which designated the U.S. and claims priority to EP 20211333.8 filed Dec. 2, 2020, the entire contents of each of which are hereby incorporated by reference.

The present invention relates to a device for fixation of a collecting means suitable for collecting small amounts of biological material, a kit-of-parts comprising said device, use of said device and a method for hygiene monitoring.

The omnipresence of microorganisms such as fungi or bacteria constitutes a veritable challenge inter alia in the pharmaceutical, the food and feed industries. Microbial contamination of a product along the production line may have severe consequences and cause illness or even death of customers.

Therefore, national and regional authorities have established strict guidelines and requirements relating to hygiene measurements and monitoring within production facilities. First of all, the introduction of microorganisms from outside the production facility is to be minimized. Additionally, conditions favoring the growth and propagation of microorganisms are to be avoided. Further along this line, the presence of microorganisms on surfaces is to be avoided, and microbes present on surfaces are to be eliminated. To this end, surfaces are subjected to regular cleaning and decontamination procedures.

To verify and monitor the efficacy as well as efficiency of the applied decontamination measures, samples have to be taken from all relevant surfaces and analyzed for potential microbial contamination. For this purpose, sponges or alternative collecting means suitable for collecting microorganisms, e.g. by means of adsorption, are swabbed over the surface of interest, and subsequently placed into a suitable container for later analysis.

Verification of successful decontamination is of particular importance in the case of surfaces which contain hard-to-reach elements such as nooks or which contain surface irregularities such as slots, and which are thus not easily accessible for decontamination means. Such surface elements are therefore at a particular risk of microbial growth and even biofilm formation, Consequently, it is necessary to provide a device suitable for sampling such hard-to-reach surface areas, which might be out of reach e.g. when using a handheld sponge. Therefore, a device is needed that allows also sampling in areas that are hard to access with a handheld sponge e.g. due to structural obstructions. In particular, such a device should also allow the collection of microorganisms from a biofilm, which may require a thorough scrubbing or even scraping of the surface under the application of an amount of force going beyond mere wiping or swabbing. To this end, a collecting means is required to be reliably fixated to said device to an extent that the collecting means does not slip out of position or even gets lost during scrubbing.

Several devices for collecting biological material have been described to date. A collecting means is typically connected to a holding device either by gluing, by hook structures or by gripping via movable pliers or tweezers features.

A crucial aspect in the workflow of surface sampling for hygiene monitoring is the detachment of the collecting means from the holding device after sampling. Commonly, the collecting means is transferred from the device into a sterile container such as a sterilized plastic bag for later analysis. In the case of the collecting means being glued to the holding device, the presence of glue residues on the collecting means pose a risk of impeding with subsequent cultivation steps to enrich collected microbes for analysis. Many devices for surface sampling require a step of snapping off the collecting means from the holding device after sampling at a predetermined breaking point or a breaking line. However, hereby fragments of the holding device are co-transferred with the collecting means into the bag, where said fragments pose a risk of damaging the bag. In addition, such fragments may have to be removed for certain subsequent analytic steps.

In U.S. Pat. No. 4,175,439 A, a device is disclosed comprising barbed tines as hook structures to hold a collecting member for absorbing liquid samples. For the purpose of surface sampling, such a device is not considered suitable due to the lack of support means that provide the fixated sample collecting member with sufficient support to allow thorough scrubbing. Moreover, the tine structures bear the risk of damaging the collecting member, thus impeding surface sampling.

In US 2013/0118275 A1, a device is shown comprising gripping members to fixate a sample collecting member. Said gripping members are adapted to switch from a first position, wherein the gripping members are closed and the collecting member is thus fixated to the device, to a second position, wherein the gripping members are opened and the collecting member is thus released from the device, upon exerting pressure on an actuator element of the device. While this device can be considered suitable for surface swabbing, it comprises moving parts, which are complicated and expensive in production, which in practice necessitate the application of considerable pressure rendering repeated samplings cumbersome and inconvenient, and which are prone to failure due to potential minor irregularities from production, in particular in those features that are designed to be moved.

WO 2018/195359 A1 relates to a device for collecting biological material from surfaces comprising a frame adapted to receive a collecting member insert, which is held in place by cantilever structures orthogonally attached to the frame. However, the provision of the frame extended by the cantilever structures is considered to be too fragile to allow thorough surface scrubbing without the provision of additional elements that allow sampling of biofilms such as scraping blades.

It is therefore an objective of the present invention to provide a device suitable for collecting biological material, preferably microorganisms, from a surface, wherein the device is suitable for sampling of biological material from surfaces including thorough scrubbing to sample biofilms, it should be suitable for easy production and require as few separate parts or sub-parts as possible. Moreover the invention aims at providing a device which provides convenient options for fixation while avoiding glue, and allows easy removal of a collecting means without the requirement for actuating a substantial change in position of movable parts of the device.

This objective was achieved by providing a device, in particular a handheld device for fixation of a collecting means suitable for collecting biological material, in particular small amounts of biological material, preferably microorganisms, e.g. for hygiene monitoring, comprising a handle, a support means, and a fixation means, wherein the support means and the fixation means are provided at a common end of the handle; wherein the support means is adapted to receive the collecting means covering an exposed end of the support means distal from the handle; wherein the fixation means is adapted to provide at least a first clamp structure adapted to fixate the collecting means to the support means; which device is essentially characterized in that the fixation means is substantially rigidly connected to the end of the handle; and wherein the first clamp structure of the fixation means comprises at least a first section distal to the end of the handle, and at least a second section more proximal to the common end of the handle than the at least first section; wherein the first section is provided laterally distal to the longitudinal axis of the handle (i.e. the end(s) of a clamp structure extend away from the support means and from the end of the handle); wherein the second section is provided laterally proximal to the longitudinal axis of the handle; and wherein the second section is adapted to fixate the collecting means. Hereby it is possible that the support means and the fixation means are provided at the common end of the handle, e.g. by connecting an end of the support means proximal to the common end of the handle, and an end of the fixation means proximal to the common end of the handle both individually at the common end of the handle. Hereby, both the fixation means and the support means are directly connected to the common end of the handle. Alternatively, it is possible that the support means and the fixation means are provided at the common end of the handle, e.g. by connecting the end of the fixation means proximal to the common end of the handle to the common end of the handle, and the end of the support means proximal to the common end of the handle to the end of the fixation means proximal to the common end of the handle, which end of the fixation means is connected to the common end of the handle. Hereby, the fixation means is directly connected to the common end of the handle, and the support means is indirectly connected to the common end of the handle via the fixation means. As another alternative, it is considered that the support means and the fixation means are provided at the common end of the handle, e.g. wherein the support means is directly connected to the common end of the handle, and the fixation means is indirectly connected to the common end of the handle via the support means. Merely for the sake of clarity, the at least second section of the fixation means is not directly in contact with either the common end of the handle or the support means. Instead, the at least second section of the fixation means is directly connected to the at least first section and to the end of the fixation means proximal to the common end of the handle. Analogously, in case of an embodiment of the device as described herein comprising another section of the fixation means, i.e. at least a third section, which at least third section is more proximal to the common end of the handle than the at least second section, the at least third section is directly connected to the at least second section and to the end of the fixation means proximal to the common end of the handle, but the at least third section is not directly connected to the common end of the handle or to the support means. By providing such a device, it becomes possible 1) to insert the collecting means into a clamp structure, i.e. between the support means and the fixation means, in particular between the support means and the first as well as the second section of the fixation means, hereby bringing the collecting means in a fixated position; 2) to achieve sufficiently tight fixation of the collecting means to the device, thus allowing swabbing and even thorough scrubbing of surfaces; and 3) to allow removal or detachment of the collecting means from the fixated position on the device after sampling, and to allow easy transfer of the collecting means into a suitable receiving container (e.g. a plastic bag) by pulling of the collecting means from the device with the fingers, especially by grabbing the collecting means with the fingers from the outside of the container, i.e. via the outside walls of the container, and detaching the collecting means by pulling the device out of the container while still holding the collecting means inside the container with the fingers. All of these functions were found to be achievable despite the substantially rigid connection of the fixation means to the handle and surprisingly without the need for moving parts. Neither was it found necessary to provide any hooking or cantilevering structures to fixate the collecting means. Thus, the device as disclosed herein does not comprise moving parts as referred to herein, hooking and/or cantilevering structures. By avoiding such structures, it was found possible to minimize the risk for tearing the collecting means and/or the receiving container.

Advantageously, such a device according to the present invention will not interfere with subsequent analysis steps of collected biological material, because it does not contain any glue or other probably polluting material. Also, such a device does not need to be destroyed e.g. by snapping off an attached collecting means from the device, thus leading to sharp-edged plastic parts. Moreover, since the device according to the present invention does not need to be destroyed to detach the collecting means from the device, it can be recycled or reused, thus contributing to a more environmentally friendly workflow in contrast to devices requiring a snapping off of the collecting means from the device. Thus, the device as disclosed herein does not comprise glue and/or a predetermined breaking point and/or a predetermined breaking line.

The support means may be provided as an essentially flat structure adapted to expose the collecting means covering the exposed end of the support means. Hereby, a collecting means may be provided to form a folded edge or a glove- or pocket-shape to be slipped over the support means, respectively which are particularly well-suitable for collecting e.g. microorganisms from a surface by swabbing or scrubbing.

The handle is provided in a manner that allows an operator person to hold the device by said handle without touching the collecting means fixated to the device. In particular, the handle is provided at a minimum length of an average adult's hand's grip. Preferably, the device is held by the handle at an end opposite from (i.e. most distal to) the end of the handle at which the support means and the fixating means are provided. Preferably, the handle is provided at a length which accommodates not only the grip of an operator's hand, but which in addition is adapted to provide further distance between the collecting means fixated to the device by the clamp structure(s) of the device, and an operator's hand holding the device at the opposite end. Preferably, the handle is provided at a length of at least 7 cm, further preferably at least 10 cm, more preferably at least 12 cm, most preferably at least 15 cm.

The collecting means may be any material suitable for collecting biological material, such as a cloth or a sponge. Preferably, the collecting means is a cellulose sponge. However, a skilled person knows alternative materials suitable for such a collecting means, e.g. non-woven material, polyurethane, polyester, cotton and microfibers, or mixtures thereof. The collecting means may be e.g. of rectangular shape to cover the exposed end of the support means, e.g. by folding or slipping the collecting means over the exposed end of the support means.

Alternatively, the collecting means may be provided in the form of a glove- or pocket-shape wherein three of four sides are closed, thus having one opening which may be pulled over the exposed end of the support means and fixated by the fixation means to the device.

With regard to the clamp structure(s), it is considered that the collecting means covering an exposed end of the support means distal from the handle may be fixated between the fixation means and the support means. In particular, it is preferred that the second section of the fixation means is provided such that it applies a pressure on the collecting means, thereby pushing the collecting means against the support means, thus fixating the collecting means to the device without the need of any additional clamping means. In other words, a clamp structure as referred to herein is formed by the support means and the fixation means, which fixation means is provided as described herein (i.e. the clamp structure is adapted to fixate the collecting means to the support means, wherein the clamp structure comprises at least a first section distal to the end of the handle, and at least a second section more proximal to the common end of the handle than the at least first section, wherein the first section is provided laterally distal to the longitudinal axis of the handle, and wherein the second section is provided laterally proximal to the longitudinal axis of the handle). Despite being provided laterally proximal to the longitudinal axis of the handle, the second section is not directly connected to the support means. At the same time, the first section of the fixation means is provided in a way that allows easy assembling or attaching the collecting means with/to the device. In particular, it is considered that the fixation means is slid in between the second section of the fixation means and the support means via the first section of the fixation means.

The fixation means is substantially rigidly connected to the end of the handle of the device as described herein. Also, the fixation means itself is rigid. Notwithstanding, the inherent flexibility or resilience of the clamp structure is unexpectedly suitable 1) for inserting a collecting means such as a sponge or cloth, as well as 2) for removing the collecting means from the device by pulling with the fingers with moderate force, i.e. the force required to pull the collecting means from the device does not exceed the strength of the intended operator (being a person conducting surface swabbing for hygiene monitoring). Hereby, the fixation of the collecting means to the device is reversible, despite being sufficiently tight to allow e.g. collecting microorganisms from a surface. In other words, the entire device does not comprise any moving parts and/or parts adapted for flexibility going beyond the flexibility/resilience inherent to the material used. The device does neither comprise nor require any means or mechanism (e.g. a hinge or rocking, sliding or pivotal features) adapted to convey or effect a movement of the fixation means relative to the handle and/or the support means, which movement goes beyond the resilience or flexibility inherent to the material of the device, in particular of the fixation means. For the sake of clarity, the entire fixation means does not comprise any sub-parts or -sections possessing any flexibility beyond the material's inherent flexibility or resilience. In this sense, the rigidity of the clamp structure allows fixating or holding the collecting means sufficiently tight to allow thorough sampling by swabbing.

In a further embodiment, the fixation means of the device described herein comprises at least a second clamp structure provided opposite to the first clamp structure, and wherein the support means is provided intermediately between the at least first clamp structure and the at least second clamp structure. It is considered that the second clamp structure is provided in mirrored orientation to the first clamp structure. It thus becomes possible to provide an even tighter fixation of the collecting means to the device without compromising the removability of the collecting means from the device by pulling with the fingers.

In another embodiment of the present invention, it is contemplated that a device as referred to herein is provided, wherein the fixation means comprises at least a third section more proximal to the common end of the handle than the at least second section, wherein the at least third section is provided laterally distal to the longitudinal axis of the handle. By, providing a fixation means further comprising at least a third section more proximal to the end of the handle than the at least second section, wherein the at least third section is provided laterally distal to the longitudinal axis of the handle, preferably provided in a wave-like shape of the fixation means, it becomes possible to allow a fine-tuning of the amount of pressure applied by the second section of the fixation means onto the collecting means folded over the support means. Providing the fixation means in such a manner, in particular in a wave-like shape is considered to allow a particularly well-balanced rigidity of said feature, allowing a most convenient handling of attaching a collecting means to the device, tightly fixating the attached collecting means during sampling, as well as of detaching the collecting means from the device after sampling.

During sampling as well as when detaching the collecting means from the device for transferring of the collecting means into a suitable receiving container (e.g. a sterile bag), damaging of the collecting means and/or the receiving container should be avoided. To minimize the risk for such damaging by tearing with any end structures of the device, the exposed end of the support means and/or the first section of the fixation means is/are provided with rounded and/or bulged edges. Hereby, the risk for damaging the collecting means either during assembly and fixation of the collecting means onto the device, or during sampling can be considerably reduced. Analogously, the risk for damaging a packing container (e.g. a sterilized bag) and/or a container for receiving the collected sample on the collecting means is reduced. Avoiding damaging e.g. tearing of the packing container is preferred to maintain sterility of the device and the collecting means inside the container. Avoiding damaging of a receiving container is preferred for two reasons: First, to avoid contamination of the taken sample with biological material that was not intended to be collected with the collecting means; and second, to avoid spilling or leakage of the collected material onto personnel or material.

When faced with the task to sample hard-to-reach areas such as e.g. nooks or corners, a sampling device is needed that allows access to said areas. To facilitate this task, a device according to the present invention is provided, wherein the support means protrudes beyond the fixation means, in particular the exposed end of the support means extends further away from the end of the handle than the fixation means. Preferably, the support means protrudes beyond the fixation means by at least 0.5 cm, further preferably by at least 1 cm or even by at least 1.5 cm (e.g. by at least 2 cm or by at least 3 cm). In addition to the improved accessibility of e.g. corners, a support means protruding beyond the fixation means provides for a sharper edge of the device, resulting in a sharper edge of the collecting means, thus facilitating firmer scrubbing e.g. to collect samples from biofilms more conveniently.

In a further embodiment, a device is provided as described herein, wherein the support means comprises at least one recess from the exposed end to form at least two protrusions. In other words, the at least two protrusions are separated from one another at the end of the support means distal to the end of the handle and connected at the end of the support means proximal to the end of the handle. Such an embodiment may be described to result in a fork-like shape of the support means. It is considered that the recess may be U-shaped, but also other recess shapes are considered including, but not limited to e.g. V-shaped or open-O-shaped. Preferably, the support means is fork-like-shaped, U-shaped, V-shaped or open-O-shaped, more preferably the support means is U-shaped. Thus, the invention relates to a device as described herein, wherein the support means is fork-like-shaped, U-shaped, V-shaped or open-O-shaped, more preferably the support means is U-shaped.

Once a surface has been sampled, e.g. by swabbing with the collecting means (e.g. a cellulose sponge) fixated to the device, the collecting means may be inserted into a container suitable for receiving samples of biological material such as microorganisms (e.g. a sterile bag); the operator may then grab the collecting means from outside the bag e.g. between the thumb and index finger and pull the collecting means from the fixation means while simultaneously pulling the device out of the bag, thereby detaching the sample-containing collecting means from the device. The container containing the collecting means may then be sealed until further analysis of the taken sample or introduced in an analyzing device. When the support means is provided to comprise at least one recess as described herein, the step of pulling the collecting means from the fixation means inserted into a sample-receiving bag with the operator's fingers was found to be more convenient than in the case of a support means without recess. In another embodiment, the device as described herein is provided, wherein the fixation means comprises at least one recess from an exposed end of the fixation means. In a further embodiment, a device as described herein is provided, wherein the at least one recess of the support means and the at least one recess of the at least one fixation means are superimposable. Hereby, the collecting means may be grabbed at a position even more proximal to the end of the handle, thus increasing the area of the collecting means to be grabbed without pressing the collecting means onto the support plate.

In yet another embodiment, a device as described herein is provided wherein the handle further comprises a stop indicator element, e.g. a bar element transversally protruding from the handle, adapted to haptically indicate a position at the handle until which the device may be held by the operator and beyond which the device should not be touched to avoid a risk for cross-contamination. Also, the stop indicator element may serve as a rest position for the operator's thumb, thereby improving user experience. Additionally, the stop indicator element serves to indicate a preferred depth of insertion of the device into e.g. a sampling bag after sampling. Preferably the stop indicator element is provided at the handle at a position from the end of the handle opposite to the end comprising the support means and the fixation means, where the length between said opposite end and said position may accommodate a grip of an operator's hand.

Concerning the production of a device as described herein, production costs on the one hand, and high quality, in particular in terms of stability on the other hand, are aspects to be considered. Both aspects were found to be satisfactorily fulfilled, when a device as referred to herein is provided as a single piece. Preferably, the device is produced by injection molding. By providing/producing the device as a single piece, it is not necessary to assemble single parts of the device individually, resulting in a number of connecting interfaces which are potentially prone to breakage, in particular during harsh surface scrubbing. Due to the absence of any movable elements of the device, in addition to a production of the device as a single piece, such a device is considered to be particularly stable and to be conveniently producible.

In another embodiment, it is considered that a device as described herein is made of a material selected from polyethylene, polypropylene, polyvinylchloride, polystyrene, polyester, polycarbonate, acrylonitrile butadiene styrene (ABS) or ABS-like material, or a composite material comprising at least two of said materials, preferably the device is made of polypropylene. Hereby, production of the device, in particular as a single piece, e.g. by injection molding, is considered to be most convenient. Further, a device as described herein made of a material as referred to above is considered to possess a preferable combination of characteristics in terms of stability, rigidity and flexibility/resilience, thus allowing for easy attachability of the collecting means to such a device, effective sampling, as well as easy detachability of the collecting means after sampling and transfer of the collecting means containing the sample into a suitable container.

When conducting hygiene monitorings, e.g. in a production facility, typically a large number of surfaces needs to be sampled. A high sampling throughput, speed and operator convenience are therefore of particular importance. It is therefore another objective of this invention to maximize user convenience.

To save time on preparatory steps such as the gathering of the individual parts required for surface sampling, a kit-of-parts is provided comprising a device as described herein, a collecting means suitable for collecting biological material, preferably microorganisms, and a container, preferably a bag, suitable for receiving the collecting means. Hereby, all parts needed to get started with surface sampling are provided at once. Preferably, the collecting means is pre-assembled, i.e. already fixated to the device, thus saving further time. Further preferably, the collecting means is provided already wetted or moistened with a solution suitable for collecting biological material, in particular microorganisms.

In a further embodiment, the kit-of-parts as described herein is provided, wherein the container is adapted to be sterile on the inside. Thus, a sample collected with the collecting means can be transferred into the container without a risk for contamination with e.g. live microorganisms that may otherwise be present in a non-sterile container. In another embodiment of the kit-of-parts described herein, the collecting means (optionally already wetted with a solution suitable for collecting biological material, in particular microorganisms) and the device are provided as sterile parts inside the container. Thus, a person tasked with taking samples from surfaces is provided with a particularly convenient means to fulfill said task in an efficient manner. In detail, the operator may take the sterile wetted collecting means fixated to the sterile device out of the sterile container, close the container, sample a surface using the collecting means fixated to the device, and transfer the collecting means containing the sample back into the container from which the sample can be taken immediately or at a later time for further analyses.

In another embodiment, the kit-of-parts as described herein is provided, wherein the collecting means is made of a material selected from non-woven material, cellulose, polyurethane, polyester, cotton and microfibers, or mixtures thereof, preferably the collecting means is made of cellulose.

For example, the collecting means may be a cellulose sponge. A cellulose sponge as collecting means has the advantage that it is relatively flat when dry. In this dry state, a cellulose sponge can be easily inserted and fixated into a device as described herein. Upon wetting or moistening e.g. by addition of a solution suitable for collecting biological material such as microorganisms, the cellulose sponge increases in size, thus being even more tightly fixated to the device. Further a cellulose sponge is well suitable for collecting e.g. microorganisms from a surface.

In another aspect, the present invention relates to a method for hygiene monitoring comprising the steps of a) providing a device as described herein, and a collecting means, wherein the device and the collecting means are provided sterilely, and wherein the collecting means is wetted (or moistened); b) collecting a sample from a surface with the collecting means fixated to the device, e.g. by swabbing the surface with the collecting means fixated to the device; c) inserting the collecting means fixated to the device into a container, preferably a bag, suitable for receiving the collecting means, wherein the container is preferably sterile on the inside; d) gripping the collecting means inserted into the container with fingers from outside the bag; e) separating the collecting means from the device by pulling the collecting means from the supporting means of the device; f) pulling the device out of the bag, thereby recovering the device; g) closing the container containing the collecting means; h) analyzing the sample enclosed in the container. Advantageously, as laid out in step f) of the method, the device is to be pulled out of the bag and will thereby recovered. Therefore it can advantageously be recycled in a method as described herein. In contrast, other devices from which the collecting means needs to be detached by snapping off or breaking at a predetermined breaking point, are inherently suitable for single-use only. Similarly, devices comprising elements designed to be movable (e.g. hinges, pivots, push buttons or actuators) are considered not suitable for multiple use e.g. due to fatigue of the material and becoming loose of the movable elements. In the case of devices comprising structures for retention of the collecting means (e.g. hook, barb or other cantilever structures), the steps c)-f) of the method described herein, wherein operation inside the bag is required, pose a particular risk of damaging the collecting means and/or the bag with said retention structures. In contrast, it was surprisingly found that due to the omission of such structures, the device according to the present invention allows safer and more convenient operation of these steps of hygiene monitoring. For step g) it is considered that the container preferably is a bag provided with a wire or filament structure at its opening, so that the bag can be closed or sealed by said wire or filament structure, e.g. by folding the bag's opening and flipping the bag over the folded opening. Any analytical measure suitable and appropriate for hygiene monitoring is considered to be encompassed by step h). For instance, step h) may comprise cell or colony counting, involving e.g. a step of addition of a buffer solution suitable for providing a cell suspension from the microorganisms collected in step b), and/or using said cell suspension e.g. in a cell counter or for plating on growth medium. Alternatively or additionally, a growth media solution for enriching specific microorganisms, e.g. for enriching *Salmonella* or *Listeria* species may be applied to the collected sample, e.g. to allow identification of surface contamination with *Salmonella*. Also encompassed are analytical steps e.g. relating to an enrichment of target nucleic acids e.g. by polymerase chain reaction, or analyses performed by using lateral flow test or on agar plates.

The invention further relates to a use of a device or a kit-of-parts as described herein for collecting a biological material, preferably microorganisms from a surface.

In the following, the present invention is further described by non-limiting figures and examples, wherein FIG. 1 is an upper perspective view of part of an embodiment of a device according to the present invention;

DETAILED DESCRIPTION

The devices or schemes thereof according to the present invention shown in FIGS. 1-6 and described below serve merely as illustrative examples and are not to be construed as limiting embodiments of the present invention. The reference signs are used consistently for the indicated features.

Figure 1:
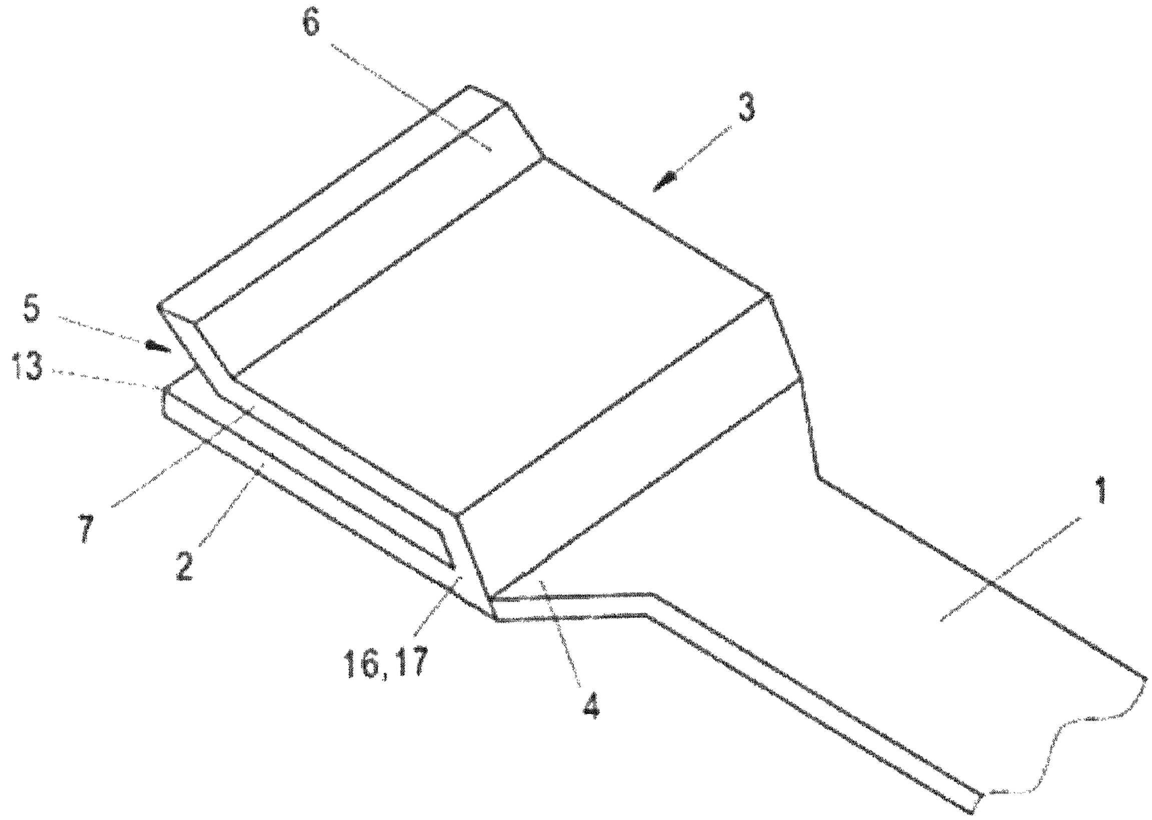

FIG. 1 is a perspective view of the most important part of the device according to the present invention, which part comprises inter alia the support means 2 and the fixation means 3 (i.e. the head part of the device), both being provided at a common end 4 of the handle 1 of the device. The support means or support plate 2 is provided in a manner that allows receiving a collecting means 9, such as e.g. a cellulose sponge, which collecting means 9 is covering the exposed end 13 of the support means 2, e.g. by being folded or slipped over the exposed end 13. The fixation means 3 comprises a first section 6 and a second section 7. The first section 6 extends away from the longitudinal axis of the handle 1 as well as from the support means 2, i.e. the first section 6 is provided laterally distal to the longitudinal axis of the handle 1. In contrast, the second section 7 is provided laterally proximal to the longitudinal axis of the handle 1, i.e. the passage between the support means 2 and the first section 6 is less narrow than the passage between the support means 2 and the second section 7. Hereby, a collecting means 9 may be inserted via the first section to be fixated in particular by the second section 7. It is considered that the second section 7 may touch the support means 2 when no collecting means is attached to the device. However, the second section 7 is not directly connected to the support means at said touching point. Instead, the second section 7 is only directly connected to the first section 6 and to the end 16 of the fixation means 3. The end 16 of the fixation means 3 in this embodiment is further connected to the end 17 of the support means 2, and both ends 16, 17 are connected to the end 4 of the handle 1. Also, due to the flexibility inherent to the material and in particular due to the shape of the fixating means 3, a collecting means 9 may be inserted in between the fixation means 3 and the supporting means 2, even in embodiments where the second section 7 touches the support means 2 when no collecting means 9 is attached to the device, despite the fixation means 3 being substantially rigidly connected to the end 4 of the handle 1. Thus, the substantially rigid connection of the fixation means 3 to the device is not considered to result in ultimate rigidity, but allows for sufficient flexibility of the fixation means 3 to allow inserting a collecting means 9 in between the fixation means 3 and the supporting means 2. Ultimately, the collecting means 9 is effectively fixated to the support means 2 of the device by the clamp structure 5 formed by the fixation means 3.

Such an embodiment of the device according to the present invention is capable of allowing easy attachment of a collecting means 2 to the device, tight fixation of the collecting means 2 to allow surface sampling, and easy removal of the collecting means 9 from the device by pulling the collecting means 9 out from the clamp structure 5 with the fingers.

Figure 2:
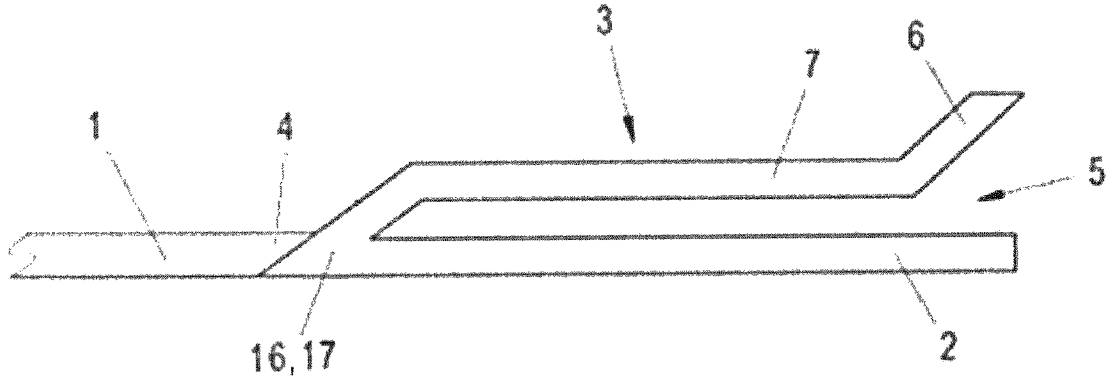
FIG. 2 is a cross section view of part of an embodiment of a device according to the present invention.

FIG. 2 is a cross section view of the head part of an embodiment of the device according to the present invention. In the embodiment shown in FIG. 2, the support means 2 is a provided as a straight extension of the handle 1.

Figure 3:
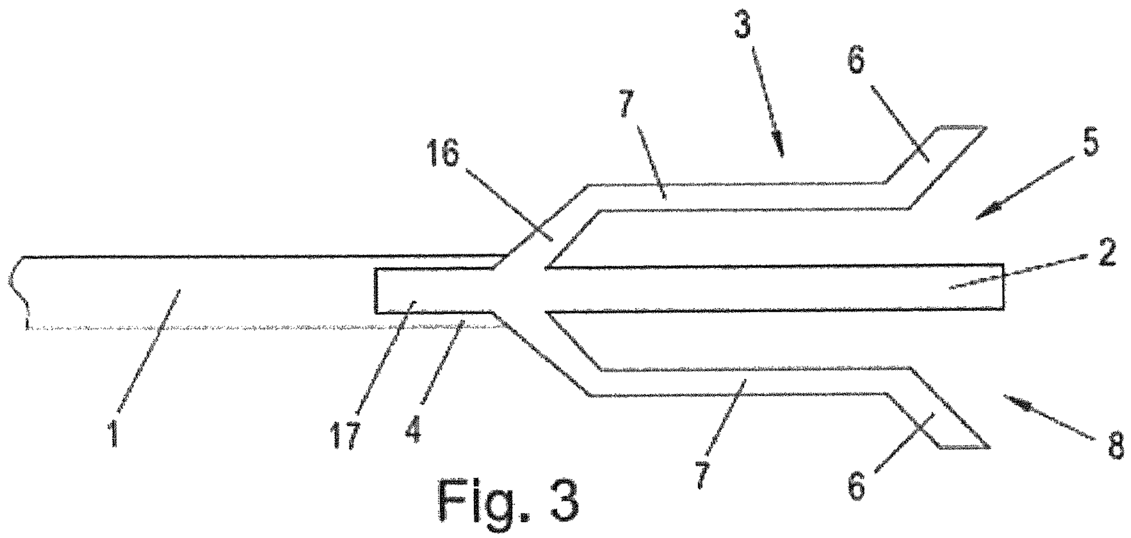
FIG. 3 is a cross section view of part of an embodiment of a device according to the present invention comprising two clamp structures.

FIG. 3 is a cross section view of the head part of a further embodiment of the device according to the present invention. In this embodiment, the fixation means 3 consists of a first clamp structure 5 and a second clamp structure 8. Therein, the second clamp structure 8 is provided opposite and mirrored to the first clamp structure 5, and the support means 2 is provided in between the first clamp structure 5 and the second clamp structure 8. Both clamp structures 5, 8 each comprise a first section 6 and a second section 7 as described above. By providing the fixation means 3 in such a form, fixation of a collecting means 9 is considered to be especially well-suited for the intended purpose. In particular, fixation of a collecting means having essentially a rectangular shape, only being folded over the exposed end 13 of the support means 2 may be achieved thereby.

In this embodiment shown in FIG. 3, the support means 2 and the fixation means 3 are provided as a single piece, attached to an end 4 of the handle 1, which handle 1 is a separate piece. Thus, a device according to the present invention may be an assembly of several sub-parts, i.e. more than one piece. Notwithstanding, it is considered that any embodiment of a device according to the present invention may preferably be provided as a single piece. In this embodiment, both the end 16 of the fixation means 3 and the end 17 of the support means are connected at the end 4 of the handle 1.

Figure 4:
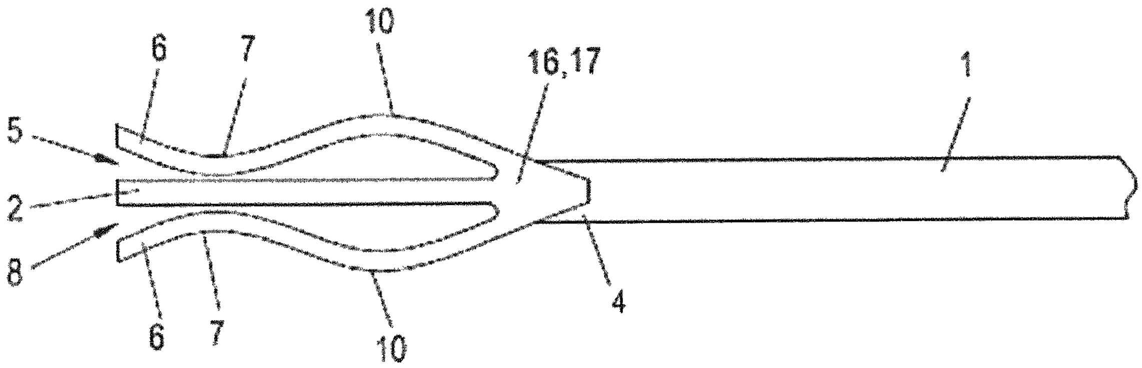
FIG. 4 is a cross section view of part of an embodiment of a device according to the present invention, wherein the fixation means comprises three sections in a wave-like shape.

FIG. 4 is another cross section view of the head part of another embodiment of a device according to the present invention. In this embodiment, the fixation means further comprises a third section 10 being provided more proximal to the end 4 of the handle 1 than the second section 7, i.e. the third section 10 is provided in between the second section 7 and the end 16 of the fixation means 3, which is connected to the end 4 of the handle 1. In the embodiment shown in FIG. 4, the end 16 of the fixation means 3 and the end 17 of the support means are connected to one another and both are connected to the end 4 of the handle 1. Further, the third section 10 is provided laterally distal from the longitudinal axis of the handle 1. In other words, the passage between the third section 10 and the support means 2 is again broader than the passage between the second section 7 and the support means 2, similar to the passage between the first section 6 and the support means 2, and unlike the passage between the second section 7 and the support means 2. In this embodiment, the fixation means 3 is provided in a wave-like shape. Such a shape of the fixation means 3 is considered to allow providing the three sections 6, 7, 10 of the fixation means 3 in a convenient and practical manner. By providing the fixation means 3 as a substantially rigid structure and substantially rigidly connected to the handle 1 in a wave-like shape, it was found that all handling steps with the device involving a collecting means 9 may be conducted in a convenient manner, including the steps of attachment, swabbing and detachment.

Figure 5:
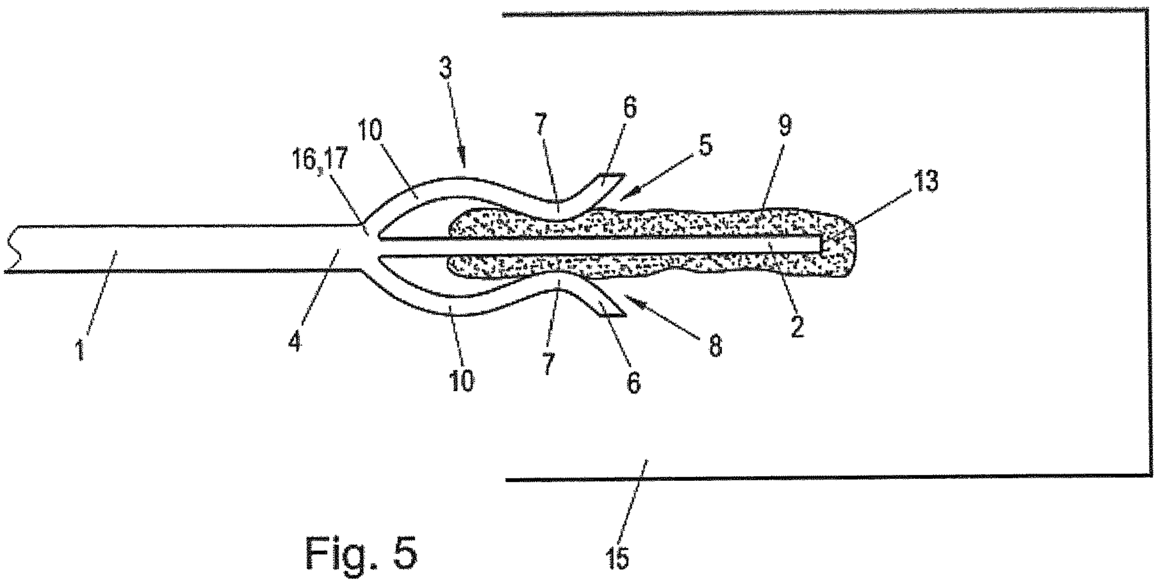
FIG. 5 is a cross section view of part of an embodiment of a device according to the present invention, wherein the support means protrudes beyond the fixation means, and wherein a collecting means is folded over an exposed end of the support means.

FIG. 5 is a cross section view of the head part of an embodiment of a device according to the present invention, wherein the support means 2 protrudes beyond the fixation means 3. In other words, the support means 2, in particular the exposed end 13 of the support means 2 extends further away from the end 4 of the handle 1 than the fixation means 3. Further shown is a collecting means 9 such as a cellulose sponge being folded over the exposed end 13 of the support means 2, and being fixated to the device by the fixation means 3, in particular two clamp structures 5, 8. It is intended that the collecting means 9 is fixated to the device by inserting the collecting means 9 at least between the first 6 and second 7 sections of the fixation means 3 and the support means 2. By providing such a device comprising a support means 2 protruding beyond the fixation means 3 sampling in otherwise hard-to-reach surface areas, e.g. nooks and corners is easily possible. Furthermore, scrubbing to collect biological material from biofilms is facilitated by such an embodiment due to the sharper and more exposed edge achievable by the folded collecting means 9. Further, a container 15 is schematically shown. After sampling, the collecting means 9 being fixated to the device can be inserted into the container 15. By grabbing the collecting means 9 from the outside of the container 15 with the fingers, and by pulling the device out of the container while retaining the grabbed collecting means 9 inside the container 15, the collecting means 9 can be detached from the device and the collected sample can be conveniently stored inside the container 15 until subsequent analysis.

Figure 6:
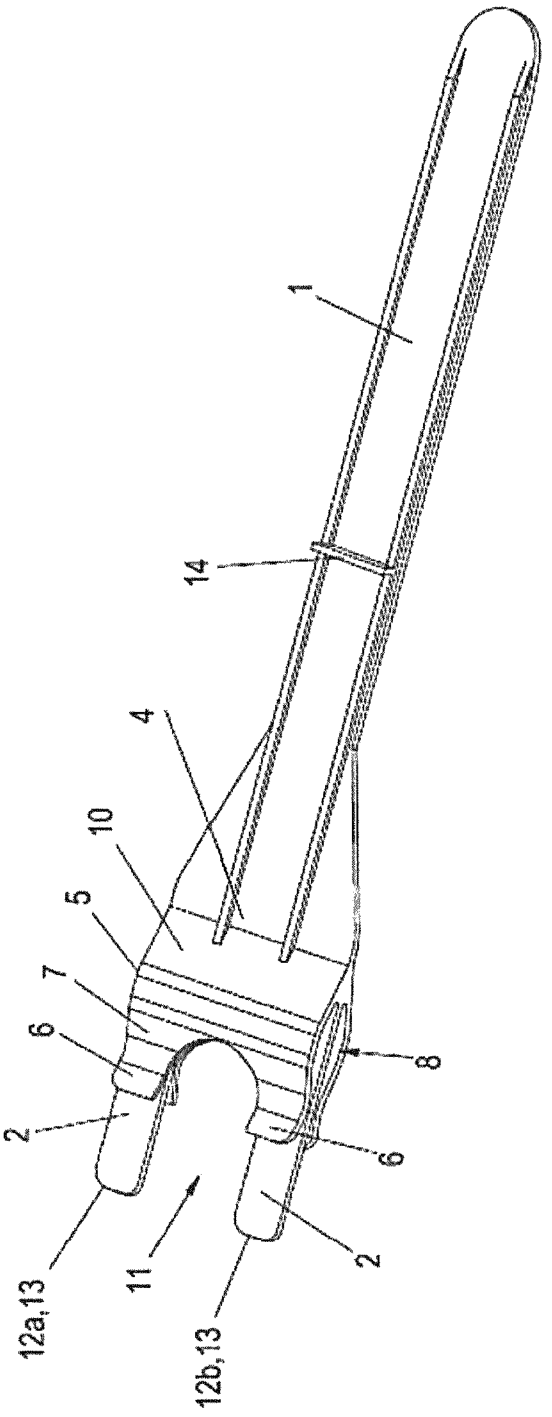
FIG. 6 is an upper perspective view of another embodiment of a device according to the present invention.

FIG. 6 is a perspective view of an embodiment of a device according to the present invention, wherein the support means 2 comprises a recess 11 from the exposed end 13 of the support means 2, thus forming a U-shaped fork-like structure having two protrusions 12*a*, 12*b*. Such a recess 11 facilitates easier removal of a collecting means 9 from the device by pulling of the operator with the fingers. It is considered that a recess 11 structure as referred to herein is not limited to a U-shape. Any recess shape that allows grabbing a fixated collecting means 9 from a device according to the present invention without pressing the collecting means 9 onto the support means 2 is suitable as a recess 11 according to the present invention. E.g. the recess 11 may have e.g. a rectangular shape, or a V-shape. The collecting means 9 may be folded over the remaining exposed end 13 of the protrusions 12*a*, 12*b*, thus stretching over the recessed length of the exposed end 13 of the support means 2. In the embodiment shown in FIG. 6, also the clamp structures 5, 8 of the fixation means 3 comprise a recess 11. Hereby, the area in which the collecting means 9 may be grabbed by the fingers without pressing the collecting means 9 onto the support means 2 becomes even larger, thus making it even more convenient for an operator to pull the fixated collecting means 9 from the device.

Also, the embodiment shown in FIG. 6 is provided with rounded edges of the support means 2 and of the fixation means 3, thus minimizing the risk for damaging a collecting means 9 and/or a container 15 for providing the device and/or a container for receiving the collecting means 9 after sampling.

Further, the embodiment shown in FIG. 6 comprises a stop indicator element 14 at the handle 1 of the device. This stop indicator element 14 is adapted to assist an operator in indicating how close to the head part s/he may preferably hold the device without risking contaminating a collecting means attached to the device. Furthermore, the stop indicator element 14 may be used in a method as described herein, wherein the stop indicator element 14 indicates the maximum insertion depth of the device into a container 15 (e.g. a bag), into which container 15 the collecting means may be transferred after sampling.

The invention claimed is:

1. A device to fix a collection medium for collecting biological material, wherein the device comprises:

a handle, a support member connected to a distal end of the handle, the support member having an exposed end which forms at least two protrusions, and a fixation member substantially rigidly connected to the distal end of the handle in operative association with the support member; wherein the support member is adapted to receive the collection medium in a manner which covers the exposed end of the support member distal from the handle; and; wherein the fixation member comprises a first clamp structure which is adapted to fix the collection medium to the support member and includes:

(i) a first section which is positioned distally of the distal end of the handle and laterally distal to a longitudinal axis of the handle, and (ii) a second section which is positioned more proximal to the distal end of the handle than the first section, and laterally proximal to the longitudinal axis of the handle such that the second section is adapted to fix the collection medium to the support member.

2. The device according to claim 1, wherein the fixation member further comprises a second clamp structure provided opposite to the first clamp structure, and wherein the support member is positioned intermediately between the first and second clamp structures.

3. The device according to claim 1, wherein the fixation member further comprises a third section more proximal to the distal end of the handle than the second section and positioned laterally distal to the longitudinal axis of the handle.

4. The device according to claim 1, wherein at least one of the exposed end of the support member and the first section of the fixation member is provided with rounded and/or bulged edges.

5. The device according to claim 1, wherein the support member protrudes beyond the fixation member.

6. The device according to claim 1, wherein the handle further comprises a stop indicator element.

7. The device according to claim 1, wherein the device is provided as a single piece.

8. The device according to claim 1, wherein the device is made of a material selected from the group consisting of polyethylene, polypropylene, polyvinylchloride, polystyrene, polyester, polycarbonate, acrylonitrile butadiene styrene (ABS) and combinations thereof.

9. A kit-of-parts comprising the device according to claim 1, a collection medium suitable for collecting biological material and a container suitable for receiving the collection medium.

10. The kit-of-parts according to claim 9, wherein an inside of the container is sterile.

11. The kit-of-parts according to claim 9, wherein the device and the collection medium are provided as sterile parts inside the container.

12. The kit-of-parts according to claim 9, wherein the collection medium is made of a material selected from the group consisting of non-woven tissue, cellulose, polyurethane, polyester, cotton and microfibers or mixtures thereof.

13. A method for collecting a biological material from a surface comprising the steps of:

(a) providing the device according to claim 1;

(b) fixing the collection medium to the fixation member such that the collection medium covers the exposed end of the support member; and (c) bringing the collection medium while fixed to the fixation member of the device into contact with the surface to thereby collect the biological material therefrom.

14. A method for monitoring hygiene comprising the steps of:

a) providing the device according to claim 1, and a collection medium fixed to the device;

b) collecting a sample from a surface with the collection medium fixed to the device by bringing the collection medium into contact with the surface;

c) inserting the collection medium fixed to the device into a container, which is suitable for receiving the collection medium;

d) gripping the collection medium inserted into the container from outside the container;

e) separating the collection medium from the device by pulling the collection medium from the support member of the device;

f) withdrawing the device out of the container;

g) closing the container containing the collection medium; and h) analyzing the sample enclosed in the container.

15. The method according to claim 14, wherein both the device and the collection medium provided according to step a) are sterile.

16. The method according to claim 14, wherein step b) comprises swabbing the surface with the collection medium while fixed to the device.

17. The method according to claim 14, wherein the container has a sterile inside.

18. A device to fix a collection medium for collecting biological material, wherein the device comprises:

a handle which comprises a stop indicator element, a support member connected to a distal end of the handle and having an exposed end, and a fixation member substantially rigidly connected to the distal end of the handle in operative association with the support member; wherein the support member is adapted to receive the collection medium in a manner which covers the exposed end of the support member distal from the handle; and wherein the fixation member comprises a first clamp structure which is adapted to fix the collection medium to the support member and includes:

(i) a first section which is positioned distally of the distal end of the handle and laterally distal to a longitudinal axis of the handle, and (ii) a second section which is positioned more proximal to the distal end of the handle than the first section, and laterally proximal to the longitudinal axis of the handle such that the second section is adapted to fix the collection medium to the support member.

19. The device according to claim 18, wherein the fixation member further comprises a second clamp structure provided opposite to the first clamp structure, and wherein the support member is positioned intermediately between the first and second clamp structures.

20. The device according to claim 18, wherein the fixation member further comprises a third section more proximal to the distal end of the handle than the second section and positioned laterally distal to the longitudinal axis of the handle.

21. The device according to claim 18, wherein at least one of the exposed end of the support member and the first section of the fixation member is provided with rounded and/or bulged edges.

22. The device according to claim 18, wherein the support member means protrudes beyond the fixation member.

23. The device according to claim 18, wherein the device is provided as a single piece.

* * * * *